US008668959B2

(12) United States Patent
Belhadjhamida et al.

(10) Patent No.: US 8,668,959 B2
(45) **Date of Patent: *Mar. 11, 2014**

(54) IMPARTING HIGH-TEMPERATURE DEGRADATION RESISTANCE TO METALLIC COMPONENTS

(71) Applicant: Deloro Stellite Holdings Corporation, Goshen (IN)

(72) Inventors: Abdelhakim Belhadjhamida, Belleville (CA); Joseph Overton, Belleville (CA); James B. C. Wu, St. Louis, MO (US)

(73) Assignee: Kennametal Inc., Latrobe, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/742,507

(22) Filed: Jan. 16, 2013

(65) Prior Publication Data

US 2013/0129926 A1 May 23, 2013

Related U.S. Application Data

(63) Continuation of application No. 11/304,127, filed on Dec. 15, 2005, now Pat. No. 8,383,203.

(60) Provisional application No. 60/636,398, filed on Dec. 15, 2004.

(51) Int. Cl.
*B05D 3/02* (2006.01)
*B29C 71/02* (2006.01)

(52) U.S. Cl.
USPC ..................... 427/376.6; 427/541; 427/376.1; 427/383.1; 427/383.3

(58) Field of Classification Search
USPC .............. 427/541, 543, 545, 180, 375, 376.1, 427/376.6, 376.7, 383.1, 383.3
See application file for complete search history.

(56) References Cited

U.S. PATENT DOCUMENTS

| | | | |
|---|---|---|---|
| 3,257,178 | A | 6/1966 | Severns, Jr. et al. |
| 3,331,700 | A | 7/1967 | Severns, Jr. et al. |
| 3,410,732 | A | 11/1968 | Smith |
| 3,676,085 | A | 7/1972 | Evans et al. |
| 3,720,537 | A | 3/1973 | Rigney |
| 3,743,556 | A | 7/1973 | Breton et al. |
| 3,795,430 | A | 3/1974 | Farley |
| 3,839,024 | A | 10/1974 | Demo, Jr. et al. |
| 3,989,863 | A | 11/1976 | Jackson et al. |
| RE29,547 | E | 2/1978 | Severns, Jr. et al. |
| 4,124,737 | A | 11/1978 | Wolfla et al. |
| 4,421,717 | A | 12/1983 | Rao |

(Continued)

FOREIGN PATENT DOCUMENTS

| | | |
|---|---|---|
| JP | 2002146409 A | 5/2002 |
| JP | 2004153087 A | 5/2004 |
| WO | 2004009860 | 1/2004 |

OTHER PUBLICATIONS

Abstract of JP2002146409; May 22, 2002.

(Continued)

*Primary Examiner* — Michael Wieczorek
(74) *Attorney, Agent, or Firm* — Matthew W. Smith, Esq.

(57) ABSTRACT

A method of imparting high-temperature, degradation resistance to a metallic component involving applying a metal slurry comprising a Co-based metallic composition containing Co, Cr, Mo, Si, and B, a binder, and a solvent to a surface of the component, and sintering the Co-based metallic composition to form a substantially continuous Co-based alloy coating on the surface of the body.

17 Claims, 10 Drawing Sheets

(56) References Cited

U.S. PATENT DOCUMENTS

| | | | |
|---|---|---|---|
| 4,490,411 | A | 12/1984 | Feder |
| 5,879,743 | A | 3/1999 | Revankar |
| 6,066,191 | A | 5/2000 | Tanaka et al. |
| 6,413,582 | B1 | 7/2002 | Park et al. |
| 6,479,014 | B1 | 11/2002 | Wu et al. |
| 6,649,682 | B1 | 11/2003 | Breton et al. |
| 6,682,780 | B2 | 1/2004 | Tzatzov et al. |
| 6,749,894 | B2 | 6/2004 | Subramanian et al. |
| 6,805,906 | B2 | 10/2004 | Moravek et al. |
| 6,852,176 | B2 | 2/2005 | Wu et al. |
| 7,262,240 | B1 | 8/2007 | Breton et al. |
| 2002/0192494 | A1 | 12/2002 | Tzatzov et al. |

OTHER PUBLICATIONS

Abstract of JP2004153087; May 27, 2004.

International Search Report, PCT/US2005/045318, dated Apr. 28, 2006, 2 pages.

International Preliminary Report on Patentability, PCT/US2005/045318, Jun. 19, 2007, 2 pages.

Written Opinion, PCT/US2005/045318, Jun. 28, 2007, Apr. 28, 2006, 7 pages.

IMPARTING HIGH-TEMPERATURE DEGRADATION RESISTANCE TO METALLIC COMPONENTS

REFERENCE TO RELATED APPLICATION

This application is a continuation application based on application Ser. No. 11/304,127 filed Dec. 15, 2005, now U.S. Pat. No. 8,383,203, and claims priority to provisional application 60/636,398, filed Dec. 15, 2004, the entire disclosures of which are incorporated herein by reference.

FIELD OF THE INVENTION

The invention relates generally to high-temperature, degradation-resistant metal parts for use in association with an internal combustion engine and more particularly to a method for imparting high-temperature degradation resistance to an irregularly shaped metal part by coating with a diffusion-bonded cobalt alloy.

BACKGROUND

High temperature wear-resistant alloys are often used in the critical parts of internal combustion engines. Certain wear and corrosion resistant cobalt alloys are distributed by Deloro Stellite Company, Inc. under the trade designation Tribaloy®. Alloys within the Tribaloy® alloy family are disclosed in U.S. Pat. Nos. 3,410,732; 3,795,430; 3,839,024; and in pending U.S. application Ser. No. 10/250,205. Three specific alloys in the Tribaloy® family are distributed under the trade designations T-400, T-800, and T-400C. The nominal composition of T-400 is Cr-8.5%, Mo-28%, Si-2.6%, and balance Co. The nominal composition of T-800 is Cr-17%, Mo-28%, Si-3.25%, and balance Co. The nominal composition of T-400C is Cr-14%, Mo-26%, Si-2.6%, and balance Co.

The foregoing alloys as well as other alloys utilize a so-called "Laves" phase (named after its discoverer Fritz Laves) to increase the hardness of the alloy. In general, Laves phases are intermetallics, i.e. metal-metal phases, having an $AB_2$ composition where the A atoms are ordered as in a diamond, hexagonal diamond, or related structure, and the B atoms form a tetrahedron around the A atoms. Laves phases are strong and brittle, due in part to the complexity of their dislocation glide processes. FIG. 1 is a photomicrograph showing irregularly shaped dendritic Laves phase particles formed by solidification of a Tribaloy® alloy.

Tribaloy® coatings and other protective coatings are sometimes applied to components that are to be used in a refractory environment associated with an internal combustion engine. For example, engine valves are often overlaid at the trim with a protective alloy for prolonging service life. Because of the regular shape of the valves, the coating can be applied with plasma transferred arc welding. With irregularly shaped components, however, plasma transferred arc welding becomes cumbersome or unfeasible. For example, sharp projections, cavities, and through holes can hinder the welding process by influencing the location at which the plasma arc is transferred to the work piece. Thermal spraying can sometimes be used to coat irregular surfaces, but it results in only a mechanically bonded coating. Mechanically bonded coatings are susceptible to spalling caused by thermal cycling. Further, thermal spraying is a line of sight process. Thus, the coating can not be applied to surfaces that cannot be reached by the spraying torch.

Many irregularly shaped parts are used in or near internal combustion engines. For instance, turbochargers can be used to improve performance of gasoline and diesel internal combustion engines. A basic turbocharger includes a turbine in the exhaust system. The turbine shares a common shaft with an air compressor in the engine's air intake system. The turbine is powered by flow of exhaust gases through the exhaust system. The turbine's power is transmitted through the common shaft to drive the air compressor, which increases the pressure at the engine's intake valves. Thus, the turbocharger improves engine performance by increasing the amount of air entering the cylinders during air intake strokes.

There are different turbocharger designs, many of which involve the use of vanes to direct the flow of exhaust gases through the turbine to improve the efficiency or other operational aspects of the turbocharger. Variable geometry turbochargers adjust their geometry to alter the way exhaust flows through the turbine in response to changing needs of the engine. For example, U.S. Pat. No. 6,672,059 discloses one example of a variable geometry turbocharger. Referring to FIG. 2 (which is a reproduction of FIG. 1 of the '059 patent), the turbine 10 comprises a turbine wheel 17 mounted on a shaft 18 inside a turbine housing 12. A volute 14 is provided to conduct exhaust gases from an internal combustion engine (not shown) into the housing 12. A plurality of vanes 22 are pivotally mounted circumferentially around the turbine wheel 17 inside the housing 12 (e.g., by pins 26 received in holes 28 on a plate 24 in the housing 12).

The vanes 22 are generally sized, shaped and positioned to direct the flow of exhaust from the volute 14 to the turbine wheel 13. Further, the vanes 22 can be pivoted to adjust flow of exhaust through the turbine 10. Each of the vanes 22 of the turbocharger illustrated in the '059 patent has an integrally formed actuation tab 30 spaced apart from the axis of the respective pin 26. Each actuation tab 30 is received in a radially angled slot 32 in a selectively rotatable unison ring 34 mounted in the housing 12 concentrically with the shaft 18. Rotation of the unison ring 34 by an actuator causes the actuation tabs 30 to pivot about the axis of the respective pin 26 so the tabs remain within their slots 32. Thus, rotation of the unison ring 34 causes the vanes 22 to pivot, thereby producing the desired change in airflow through the turbine 10.

Actuation of the vanes 22 in this manner results in stress and wear on the pins 26 and the actuation tabs 30. Reliable operation of the turbocharger requires that the vanes 22, unison ring 34, pins 26 and other turbocharger components continue to perform as designed despite being exposed to numerous high temperature cycles, the chemical environment of the engine exhaust, and the mechanical stresses associated with operation of the turbocharger.

There are many variations on the variable geometry turbocharger theme. Some examples are illustrated in U.S. Pat. No. 4,679,984 (pivoting vanes mounted by three pins); U.S. Pat. No. 4,726,744 (integrally-formed vane and vane actuator combination); U.S. Pat. No. 6,709,232 (vane actuated by lever arm attached to side of vane); U.S. Pat. No. 4,499,732 (nozzle comprising fixed vanes translated axially by pneumatic actuators to adjust flow through turbine). One common thread tying the foregoing turbocharger designs together (and numerous other turbocharger designs) is that the moveable components therein (e.g., vanes and vane actuators) are irregularly shaped (i.e., they have sharp projections, cavities and/or through holes). Further, turbochargers are illustrative of the many complex irregularly shaped components that are used throughout internal combustion engines and auxiliary systems thereof.

Although it is desirable to apply a protective high-temperature, degradation-resistant coating to these components, their irregular shapes make this difficult or uneconomical to achieve. Consequently, many irregularly shaped component parts are made by investment casting with expensive alloys. In other cases, durability may be sacrificed by using a cheaper but less resistant material to make the part.

SUMMARY OF INVENTION

Briefly, therefore, the invention is directed to a method of imparting high-temperature, degradation resistance to a component associated with an internal combustion engine. The method involves applying a metal slurry comprising a Co-based metallic composition, a binder, and a solvent to a surface of the component; and sintering the Co-based metallic composition to form a substantially continuous Co-based alloy coating on the surface of the body.

In another aspect the invention involves applying a metal slurry which comprises between about 30 and about 60 wt % of Co-based metallic composition, between about 0.5 and about 5 wt % binder, and between about 40 to about 70 wt % solvent to a surface of the component; and heating to remove the solvent and binder and to sinter the Co-based metallic composition to form a substantially continuous Co-based alloy coating on the surface of the body, wherein the Co-based alloy coating has a microstructure characterized by a generally non-dendritic, irregularly spherical, nodular intermetallic phase.

The invention is also directed to an internal combustion engine component comprising a metallic substrate and a Co-based metallic coating thereon which is a Co-based alloy having a microstructure characterized by a generally non-dendritic, irregularly spherical, nodular intermetallic phase, which coating has a thickness between about 100 and about 1000 microns.

Other aspects and features of the invention will be in part apparent and in part pointed out hereinafter.

BRIEF DESCRIPTION OF DRAWINGS

Corresponding reference numbers indicate corresponding parts throughout the drawings.

DETAILED DESCRIPTION

Figure 1:
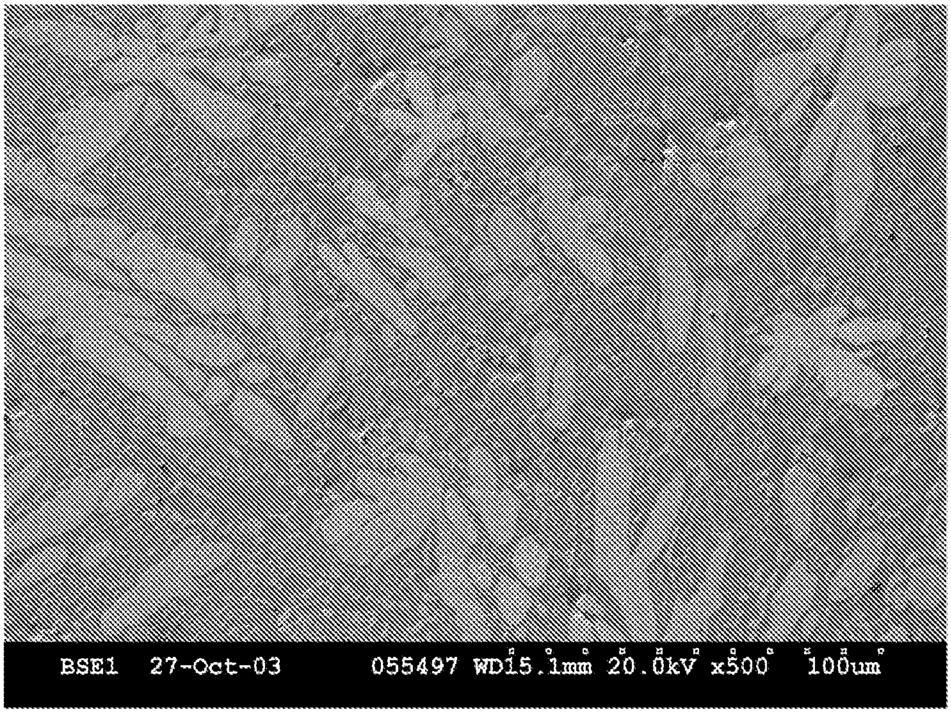
FIG. 1 is a photomicrograph showing irregularly shaped Laves phase particles produced by solidification of a Tribaloy® alloy in a prior art process.

One embodiment of the invention is a high-temperature, degradation-resistant component part for use in a refractory environment associated with an internal combustion engine. Strictly speaking, the invention encompasses components for different sections of different engines and therefore applies to many different service temperatures. But as a general proposition, the component, and in particular the coating applied by this invention, is high-temperature, degradation resistant in that it is capable of regularly encountering service temperatures which are, for example, on the order of about 600° C. or greater.

Generally, the component part comprises a metal body. For example, the body can comprise a carbon steel, stainless steel, or alloy steel body produced by virtually any manufacturing process suitable for making a body having the desired shape of the component part. The body has an outer surface, at least a portion of which is coated with a diffusion-bonded, high-temperature, degradation-resistant Co alloy. Optionally, the entire outer surface is coated with the diffusion-bonded, high-temperature, degradation-resistant coating, but it may be more cost effective to coat only selected portions of the outer surface having the greatest need for degradation resistance.

The high-temperature, degradation-resistant coating is a substantially continuous coating of Co alloy metallurgically bonded to the shaped component body. Exemplary alloys include those Co-based alloys having between about 40 and about 62 wt % Co and available commercially under the trade designation Stellite®. Other exemplary alloys include those having between about 40 and about 58 wt % Co and commercially available under the designation Tribaloy®, as well as modifications of both the Stellite® and Tribaloy® alloys to render them more amenable to application by the method of the invention.

Boron is included in low amounts in the alloy to lower the sintering temperature. This allows the coating to be sintered according to the methods described below at a low enough temperature such that excess diffusion from the metal body into the coating is avoided. In one preferred embodiment, the alloy comprises B in the range of about 0.05 to about 0.5 wt %. Less than about 0.05% does not have significant impact on the sintering temperature in these alloys. Greater than about 0.5% B is avoided because of its impact on the mechanical and high temperature properties of the alloy.

The alloys used in this invention otherwise include the traditional alloying constituents for high-temperature, wear applications, i.e., C, Cr, and/or W. Optional modifications employing Mo, Fe, Ni, and/or Si may also be employed. Accordingly, in one embodiment the invention employs a Co-based alloy which comprises between about 0.05 and about 0.5 wt % B, between about 5 and about 20 wt % Cr, between about 22 and 32 wt % Mo, between 1 and about 4 wt % Si, and balance Co. All percentages herein are by weight unless otherwise noted. One particular exemplary alloy contains about B-0.15%, Cr-8.5%, Mo-28%, Si-2.6%, C-0.04%, and balance Co. Another exemplary alloy contains about B-0.15%, Cr-17%, Mo-28%, Si-3.25%, and balance Co. And another exemplary alloy contains about B-0.15%, Cr-14%, Mo-26%, Si-2.6%, C-0.08%, and balance Co. Another embodiment comprises Cr-16.2%, Mo-22.3%, Si-1.27%, C-0.21%, and balance Co.

Other embodiments employ a Co-based alloy, such as a Co—Cr—W—Si alloy, which comprises between about 0.05 and about 0.5 wt % B, between about 25 and 33 wt % Cr, between about 0.5 and 3 wt % Si, and W in an amount up to about 15 wt % W. These embodiments do not have the non-dendritic Laves phase discussed above and in Example 2. One particular exemplary alloy is between about 0.05 and 0.5 wt % B added to Stellite 6, which has a nominal composition of 1.2% C, 28% Cr, 1.1% Si, and 4.5% W. Another particular exemplary alloy is between about 0.05 and 0.5 wt % B added to Stellite 12, which has a nominal composition of 1.4-1.85%

C, 29.5% Cr, 1.5% Si, and 8.5% W. Another particular exemplary alloy is between about 0.05 and 0.5 wt % B added to Stellite 3, which has a nominal composition of 2.45% C, 31% Cr, 1% Si, and 13% W.

Figure 3:
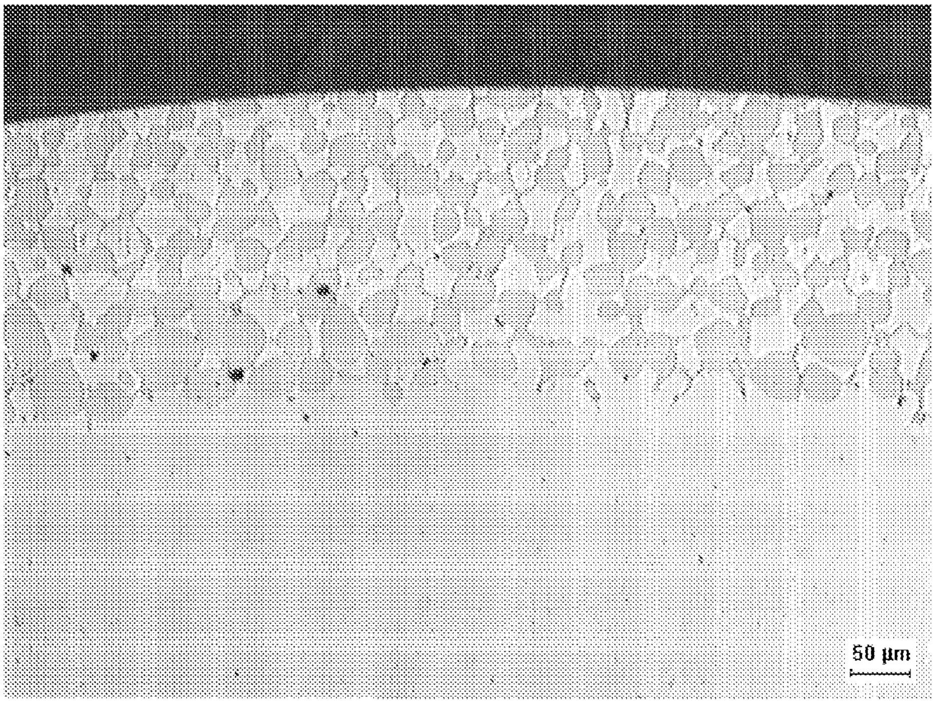
FIG. 3 is a photomicrograph showing approximately spherical Laves phase particles in a high-temperature, degradation-resistant coating.
Figure 4:
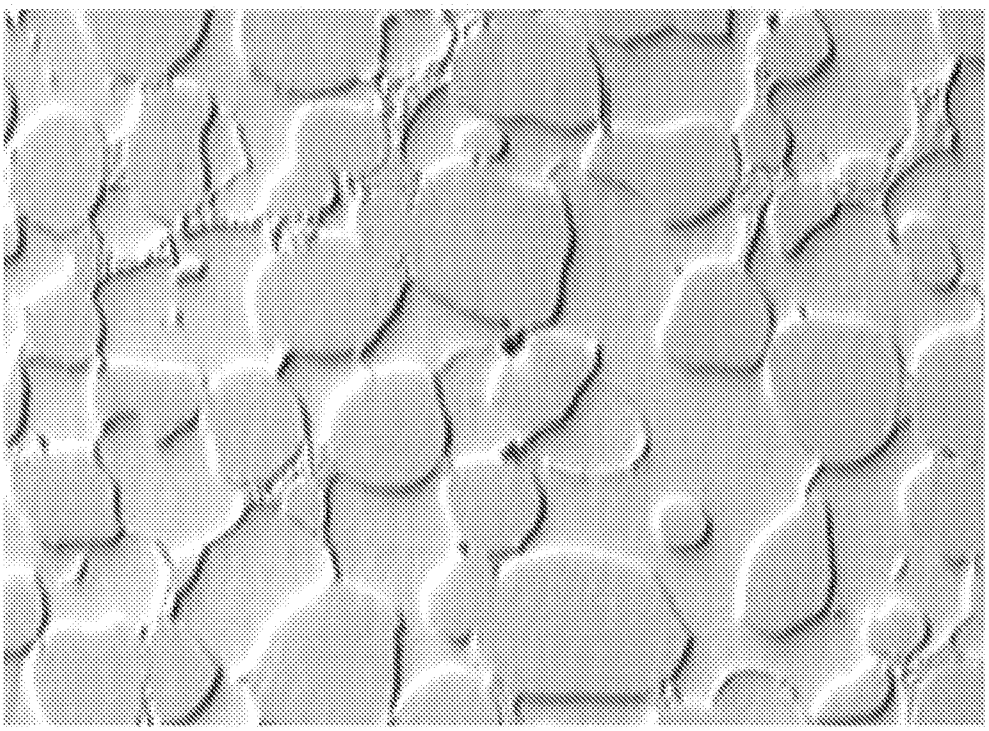
FIG. 4 is a magnified photomicrograph of the Laves phase particles shown in FIG. 3.

In one embodiment of the invention, the high-temperature, degradation-resistant coating formed by the Co alloy according to manufacturing methods discussed below comprises Laves phase particles. The microstructure of the high-temperature, degradation-resistant coating includes Laves phase nodules (e.g., approximately spherical Laves phase particles), as shown in FIGS. 3 and 4. The nodules occur partly as dispersed particles and partly as interconnected particles. Further, the interconnections between nodules include a plurality of thin filamentous Laves phase interconnections between otherwise dispersed Laves phase nodules. The Laves phase particles are interpenetrated with a softer non-Laves phase portion of the alloy. The Laves phase particles have an average hardness value of about HV 1124, while the non-Laves phase portion of the coating has an average hardness value of about HV 344.

The nodular Laves phase particles give the high-temperature, degradation-resistant coating improved wear properties. Irregular dendritic Laves phase particles such as those shown in the prior art solidified Tribaloy® alloy (FIG. 1) tend to generate stress risers which cause cracks. In contrast, the nodular Laves phase particles are less likely to generate stress risers, thereby making the coating more resistant to cracking.

The coating is typically between about 100 and about 1000 microns thick. In one embodiment the coating is about 100 microns to about 300 microns thick, such as between about 250 and about 300 microns thick. Further, the coating is diffusion bonded to the body of the component part, but diffusion from the substrate is substantially limited to the immediate vicinity of the bond line. Excessive diffusion from the metal body into the coating can reduce wear resistance of the coating.

A high-temperature, degradation-resistant coating having the foregoing characteristics can be applied to virtually any component part used in internal combustion engines or auxiliary systems thereof, including a wide variety of irregularly shaped components. Some specific components will now be discussed in more detail.

Figure 5:
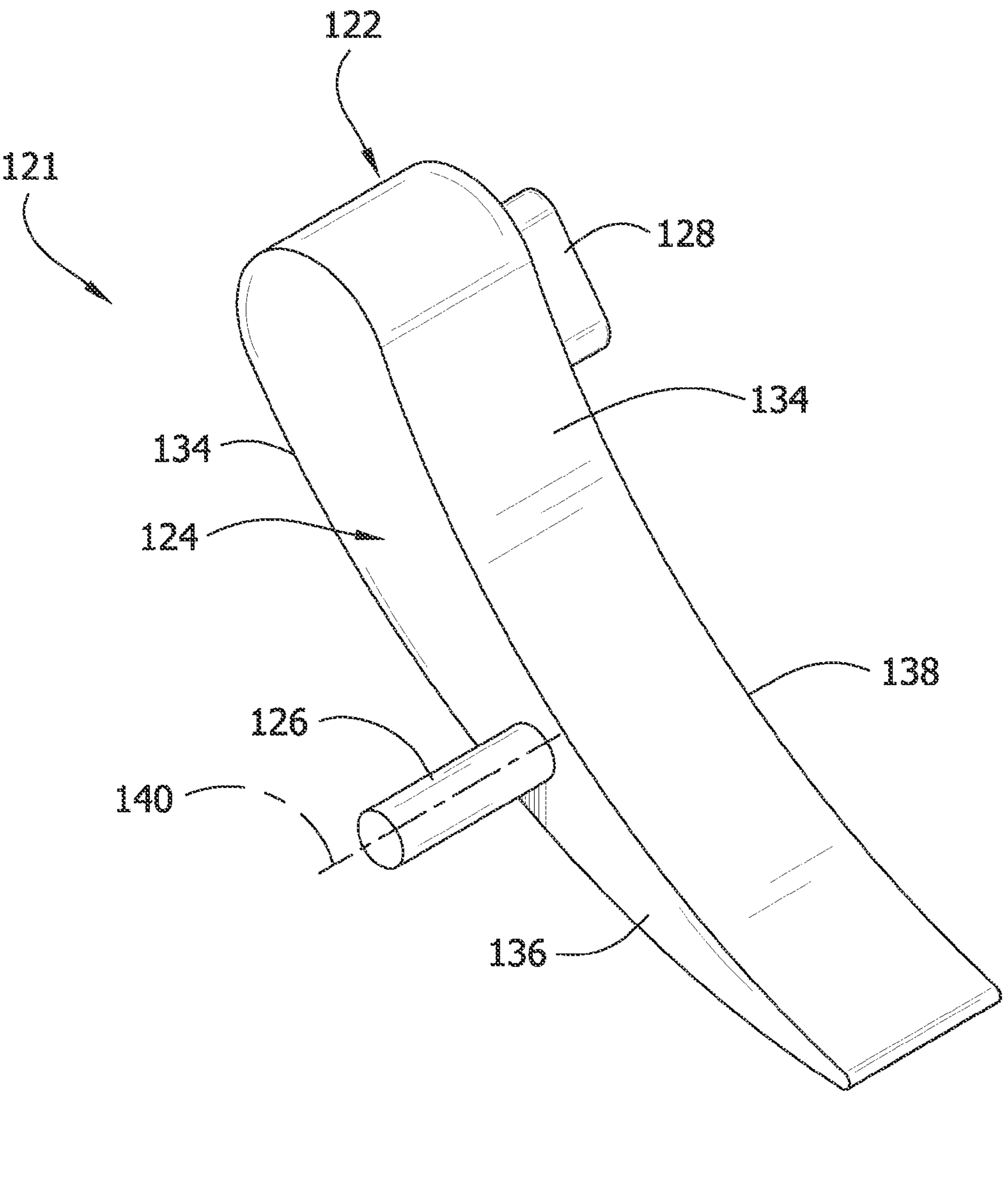
FIG. 5 is a perspective view of a vane having a mounting post.

FIG. 5 shows a turbocharger vane 121 comprising a body 122 shaped to form an air deflecting portion 124, a pin portion 126, and an actuation tab portion 128. The air deflector portion 124 is an elongate wedge having contoured airfoil surfaces 134 sized and shaped to deflect flow of exhaust through the turbocharger. The pin portion 126 is an elongate generally cylindrical projection extending substantially perpendicularly from a side 136 of the air deflecting portion 124. The actuation tab portion 128 is a projection extending substantially perpendicularly from the opposite side 138 of the air deflecting portion 124. The actuation tab portion 128 is offset from the axis 140 of the pin portion 126. In one exemplary embodiment, the entire body 122 is coated with the high-temperature, degradation-resistant coating.

Figure 2:
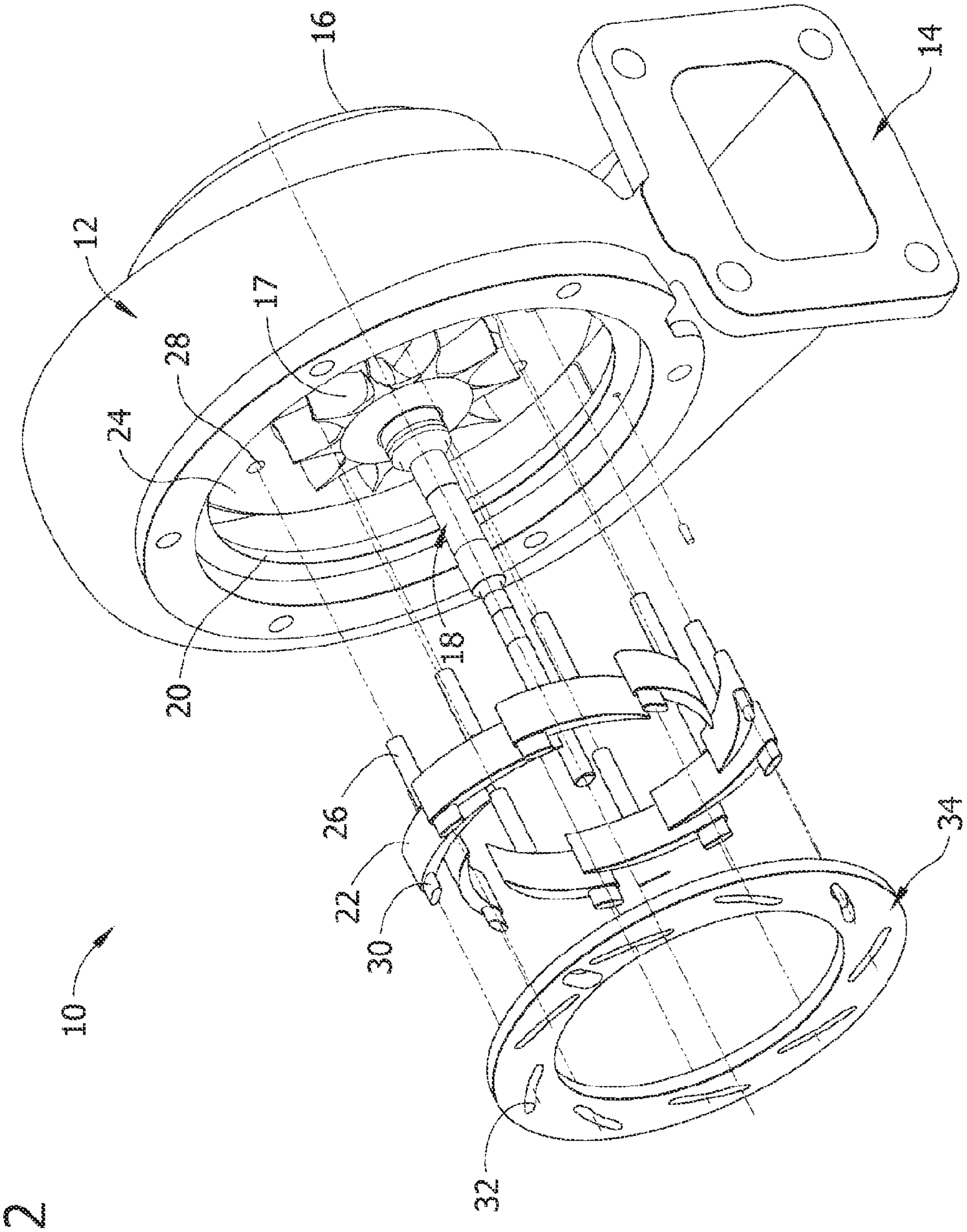
FIG. 2 is an exploded perspective view a turbine of a prior art variable geometry turbocharger reproduced from U.S. Pat. No. 6,672,059.

The vane 121 is suitable for use with a variable geometry turbocharger, similar to the prior art turbocharger shown in FIG. 2. Operation of the vane 121 involves inserting the pin portion 126 in a mounting hole (not shown) to pivotally mount the air deflector 124 in the exhaust stream of an internal combustion engine. The actuation tab portion 128 is received in a slot in a selectively rotatable unison ring so that the actuation tab is pivoted about the axis 140 of the pin portion 126 upon rotation of the unison ring, thereby adjusting the rotational orientation of the air deflector portion 124. Because of the combined mechanical, thermal, and chemical protection provided by the high-temperature, degradation-resistant coating, the vane 121 is resistant to the wear it is subjected to during it operation.

In an alternative embodiment, selected parts of the outer surface of the body 122 are not coated with the high-temperature, degradation-resistant coating. For example, it may be more economical to avoid coating the air deflector portion 124, which is generally not subjected to the same levels of stress as the pin portion 126 and actuation tab portion 128. Thus, the high-temperature, degradation-resistant coating can be applied only to the pin portion 126 and/or the actuation tab portion 128 to provide the coating only where it is most needed and thereby reduce the cost of the vane 121.

Figure 6:
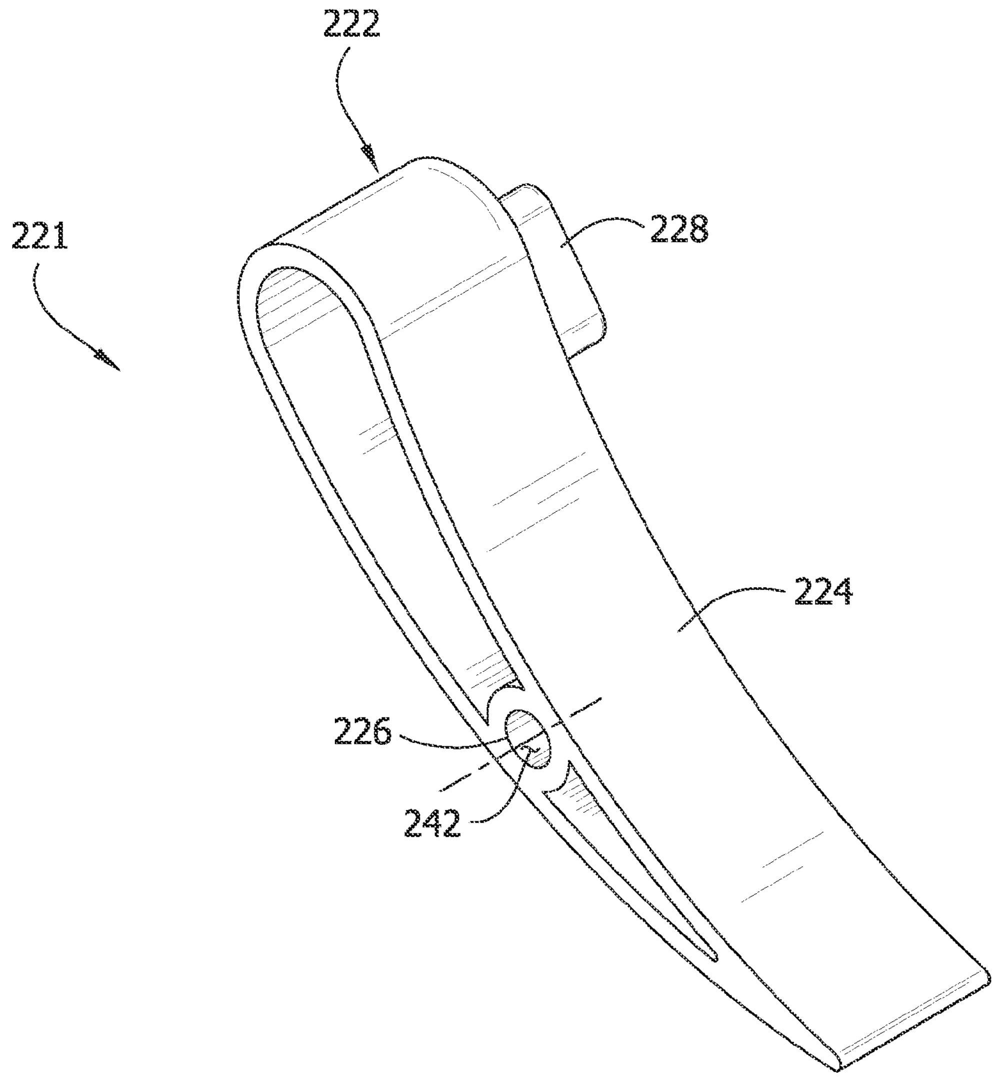
FIG. 6 is a perspective view of a vane having a cavity for receiving a pivot pin.

Another turbocharger vane 221 is shown in FIG. 6. The vane 221 is similar to the vane shown in FIG. 5 in that its body 222 comprises an air deflector portion 224 and an actuation tab portion 228. However, the body 222 does not include a pin portion. Instead, the body 222 comprises a cavity defining portion 226 in which the outer surface of the body defines a cavity 242 for receiving a mating component (e.g., a pin) for pivotally mounting the vane 221 in the engine's exhaust system. In one exemplary embodiment, the entire outer surface of the body 222, including the part of the outer surface of the cavity defining portion 226, is coated with a high-temperature, degradation-resistant coating. The vanes 121, 221 operate in substantially the same way, except that the vane 221 shown in FIG. 6 is mounted on a mating component (e.g., a pin) received in the cavity 242 and the high-temperature, degradation-resistant coating on the surface of the cavity defining portion 226 protects the component from wear with the mating component. Further, it may be desirable to coat only the cavity defining portion of the outer surface and/or the actuation tab portion to reduce cost of the vane 221.

Another component is an actuator for producing axial translation of a fixed-vane nozzle of a variable geometry turbocharger. The body of the nozzle actuator comprises an arm, pin, and through holes. In one exemplary embodiment, the entire body is coated with the high-temperature, degradation-resistant coating describe above. In service, pins and through holes wear against the mating components of the actuation system. However, the combined mechanical, thermal, and chemical protection provided by the high-temperature, degradation-resistant coating makes the component resistant to the wear. Alternatively, selected segments of the outer surface of the body are not coated with the high-temperature, degradation-resistant coating. For example, it may be desirable to partially coat the body with the high-temperature, degradation-resistant coating including at least part of a pin portion and/or at least part of a through-hole defining portion to reduce the cost of coating the actuator by not coating parts of the actuator that do not wear against other parts.

Those skilled in the art will recognize that the shapes of the components described above are not critical to operation of a turbocharger. On the contrary, there are many different turbocharger designs and a corresponding variety in the design of vanes, vane actuators, and variable nozzle geometry actuation system. Vanes and vane actuators having different shapes than those shown and described herein can be coated or partially coated with the high-temperature, degradation-resistant coating without departing from the scope of the invention. Further, high-temperature, degradation-resistant component parts of the present invention are not limited to vanes and vane actuators. Broadly, the invention covers any high-temperature, degradation-resistant component part for use in a refractory environment associated with an internal combustion engine and having the high-temperature, degradation-resistant coating described herein.

In accordance with the invention, a powder slurry deposition process is used to apply the high-temperature, degradation-resistant coating. The slurry process comprises preparing a slurry comprising powdered Co alloy particles suspended in an organic binder and solvent. The outer surface of a component part is cleaned in preparation for the coating process. The slurry is then applied to the component part, yielding an internal combustion engine component shape having a slurry which comprises between about 30 and about 60 wt % of Co-based metallic composition, between about 0.5 and about 5 wt % binder, and between about 40 to about 70 wt % solvent on a surface of the component. The slurry is then allowed to dry. After the component part is dry, the component is heated in a vacuum furnace to sinter the Co alloy particles and drive off the carrier.

The slurry comprises fine powdered Co alloy particles. The Co alloy particles have the same composition as the Co alloy discussed above with respect to all constituents except possibly boron. The boron can either be present in the alloy particles or it can be added to the slurry in the form of boric acid. The average size of the alloy particles is preferably less than 53 microns (e.g., −270 mesh). The organic binder is a substance such as methyl cellulose that is capable of temporarily binding the Co alloy particles until they are sintered. The solvent is a fluid (e.g., water or alcohol) capable of dissolving the organic binder and in which the alloy particles will remain in suspension. The range of these major components of the slurry is as follows:

Alloy powder: about 30 to about 60 wt %

Binder: about 0.5 to about 5 wt %

Solvent: about 40 to about 70 wt %

In one particular embodiment these constituents are present as follows:

Alloy powder: about 41 wt %

Binder: about 0.75 wt %

Solvent: about 58.25 wt %

The slurry is prepared by mixing the powdered alloy particles, binder, and solvent (e.g., by agitation in a paint mixer). After mixing, the slurry is allowed to rest to remove air bubbles. The time required to remove the air bubbles will vary depending on the number of air bubbles introduced during mixing, which depends to a large extent on the method or apparatus used to mix the slurry. A metal part can be dipped in and removed from the slurry as a simple test of the amount of air bubbles in the slurry. If the slurry adheres to the part in a smooth coat, removal of air bubbles is sufficient.

The metal body of the parts to be coated need to be clean and smooth. The steps taken to clean and smooth the metal body (if any are needed) will vary, depending on the metallurgical processes used to produce the metal body. Generally solvents and the like are used to remove any dirt and grease from the surfaces to be coated. If the surface of the metal body is not sufficiently smooth, the metal body may need to be polished or otherwise smoothed. The metal body is ready for being coated once the surface of the metal part is clean and smooth enough that the coating will be smooth when it adheres to the surface of the metal body.

Application of the slurry to the metal body is preferably achieved by dipping the metal body in the slurry. Alternatively, the slurry can be applied to the outer surface of the metal body by any method suitable for applying paint to a workpiece. Thus the slurry can be brushed, poured, rolled, and/or sprayed onto the outer surface of the metal body. The viscosity of the slurry can be adjusted to suit the method of application by controlling the proportion of solvent in the slurry. Further, the slurry can be applied to only selected portions of the metal body using any of the foregoing methods or combinations thereof. Thus, it can be appreciated that the slurry is easily applied to the outer surface of the metal body regardless of the geometry of the metal body. Specifically, the slurry can easily be applied to projections, cavity defining portions of the body, and through hole defining portions of the body. Once the slurry is applied to the metal body, it is allowed to dry (e.g., air dry) until the solvent has substantially evaporated.

After the solvent has evaporated, the component is placed in a furnace to sinter the Co powder particles and drive off the organic binder. The temperature and duration of the firing period needed to sinter the particles can readily be estimated by referring to the sintering temperature of the Co alloy. The inclusion of B in the Co alloy lowers the sintering temperature of the Co alloy so the diffusion from the metal body into the coating is limited to the bond line. This prevents excessive diffusion from the metal body into the coating, which could lower the wear resistance of the component. The atmosphere in the furnace is preferably a non-oxidizing atmosphere (e.g., inert gas or a vacuum).

Sintering of one exemplary alloy which contains about B-0.15%, Cr-8.5%, Mo-28%, Si-2.6%, and balance Co is accomplished at a temperature of about 2300° F. (1260° C.) for about 60 minutes. Sintering of another exemplary alloy which contains about B-0.15%, Cr-17%, Mo-28%, Si-3.25%, and balance Co is accomplished at a temperature of about 2200° F. (1204° C.) for about 60 minutes. Sintering of another exemplary alloy which contains about B-0.15%, Cr-14%, Mo-26%, Si-2.6%, and balance Co is accomplished at a temperature of about 2300° F. (1260° C.) for about 60 minutes.

The following examples further illustrate the invention.

EXAMPLE 1

Wear tests were conducted by establishing a wear couple between pins coated according to the method of the invention and solid tiles. The pins were 0.75 inch (2 cms) long and 0.25 inch (0.6 cm) diameter. The tiles were 1.25 inch (3 cms)×1.25 inch (3 cms)×0.25 inch (0.6 cm). A long edge of the pins was applied to the tiles at a force of 14.05 N in a static air furnace at 600° C. The pins were rotated about an axis perpendicular to the tile surface for 60 minutes at a frequency of 1 Hz. Surface roughness (Ra) of the tiles was measured and is an indication of surface damage due to wear. Higher roughness indicates greater material transfer:

| Pin/Tile | | Tile (Ra) |
|---|---|---|
| T-400 on 316 ss/Cast T-400 | Coating/Solid | 0.07 |
| T-800 on 316 ss/Cast T-400 | Coating/Solid | 0.07 |
| T-400C on 316 ss/Cast T-400 | Coating/Solid | 0.09 |
| Cast T-400/Cast T-400 | Solid/Solid | 0.11 |
| T-800 on 420 ss/Cast T-400 | Coating/Solid | 0.13 |
| YSZ/Cast T-400 | Ceramic/Solid | 0.14 |
| PL-33/Nitrided 316 ss | Solid/Solid | 0.39 |
| Stellite 6B/Stellite 6B | Solid/Solid | 0.73 |
| PL-33/316 | Solid/Solid | 13.23 |

These results show that the coatings are generally more wear-resistant than their solid counterparts. In particular, comparing the T-400 and T-400C coatings to cast T-400 shows lower wear indicators with the coatings (0.07 and 0.09) in comparison to their solid counterpart (0.11). Moreover, these coatings, as well as the T-800 coatings, show lower wear than other solids YSZ, PL-33, and Stellite 6B. The nominal composition of the T-400 coating was B-0.15%, Cr-8.5%, Mo-28%, Si-2.6%, and balance Co. The nominal composition of the T-800 coating was B-0.15%, Cr-17%, Mo-28%, Si-3.25%, and balance Co. The nominal composition of T-400C coating was B-0.15%, Cr-14%, Mo-26%, Si-2.6%, and balance Co. PL-33 is a proprietary iron-based alloy commonly used in the automotive industry. YSZ refers to yttria-stabilized zirconia.

EXAMPLE 2

Figure 7:
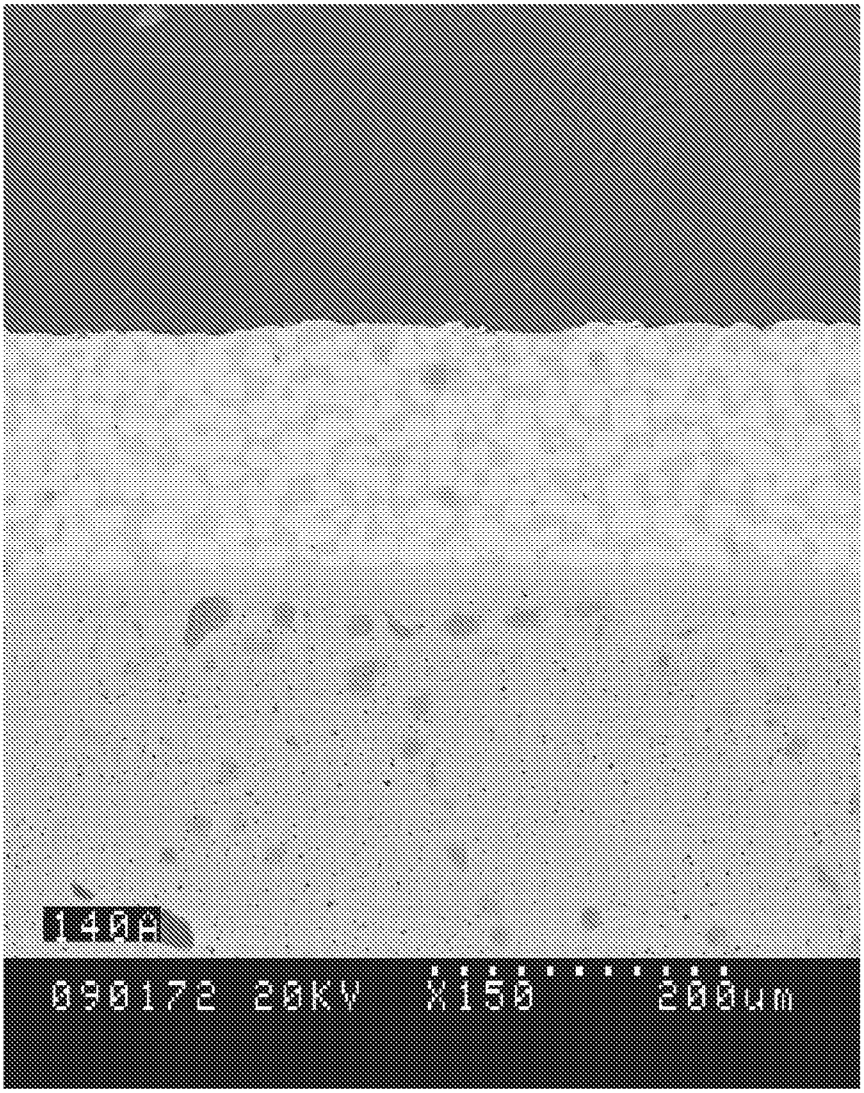
FIGS. 7-8 are photomicrographs of a coating applied according to the invention.
Figure 8:
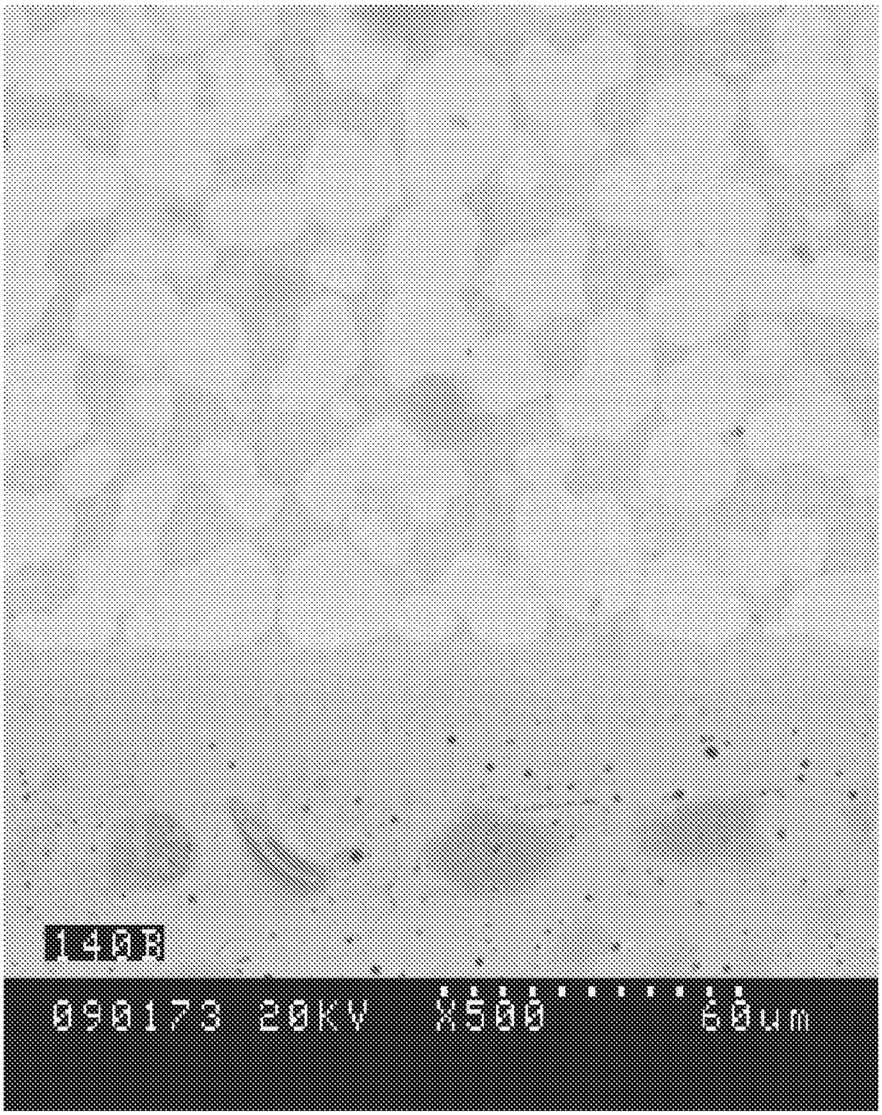

Back-scattered electron image photomicrographs were taken of a T-800 coating nominally comprising B-0.15%, Cr-17%, Mo-28%, Si-3.25%, and balance Co, and are presented in FIG. 7 (150×) and FIG. 8 (500×). The substrate was 416 stainless steel. The light particles indicating a high Mo concentration are Laves phase. Advantageously, they are evenly distributed, and there are no elongated or irregularly shaped particles, such as those often observed in castings. In particular, the microstructure, like the microstructure of FIGS. 3 and 4, contains the high-Mo Laves phase which is a generally non-dendritic, irregularly spherical, nodular intermetallic. This microstructure contributes to an improvement in ductility of the T-800 coating of the invention nominally comprising B-0.15%, Cr-17%, Mo-28%, Si-3.25%, and balance Co.

EXAMPLE 3

Figure 9:
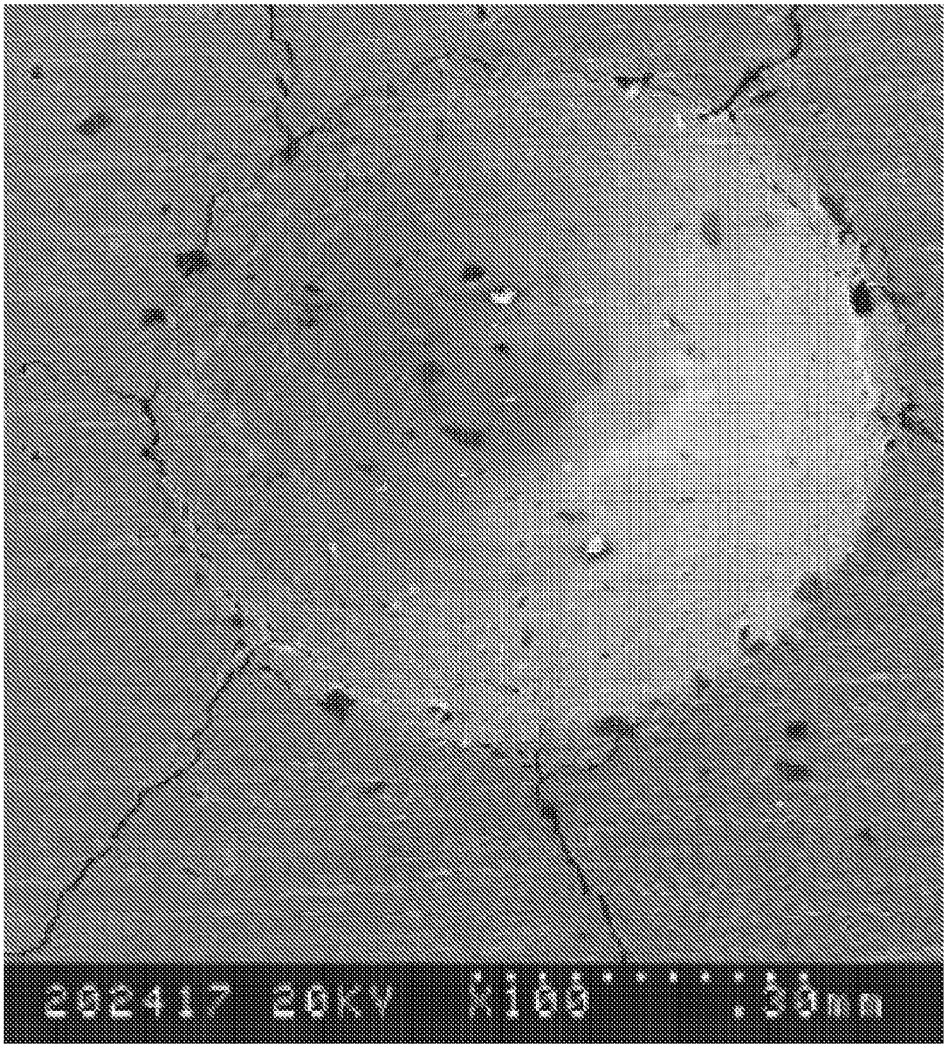
FIGS. 9-10 are photographs resulting from a ductility/crack test performed in the working examples.
Figure 10:
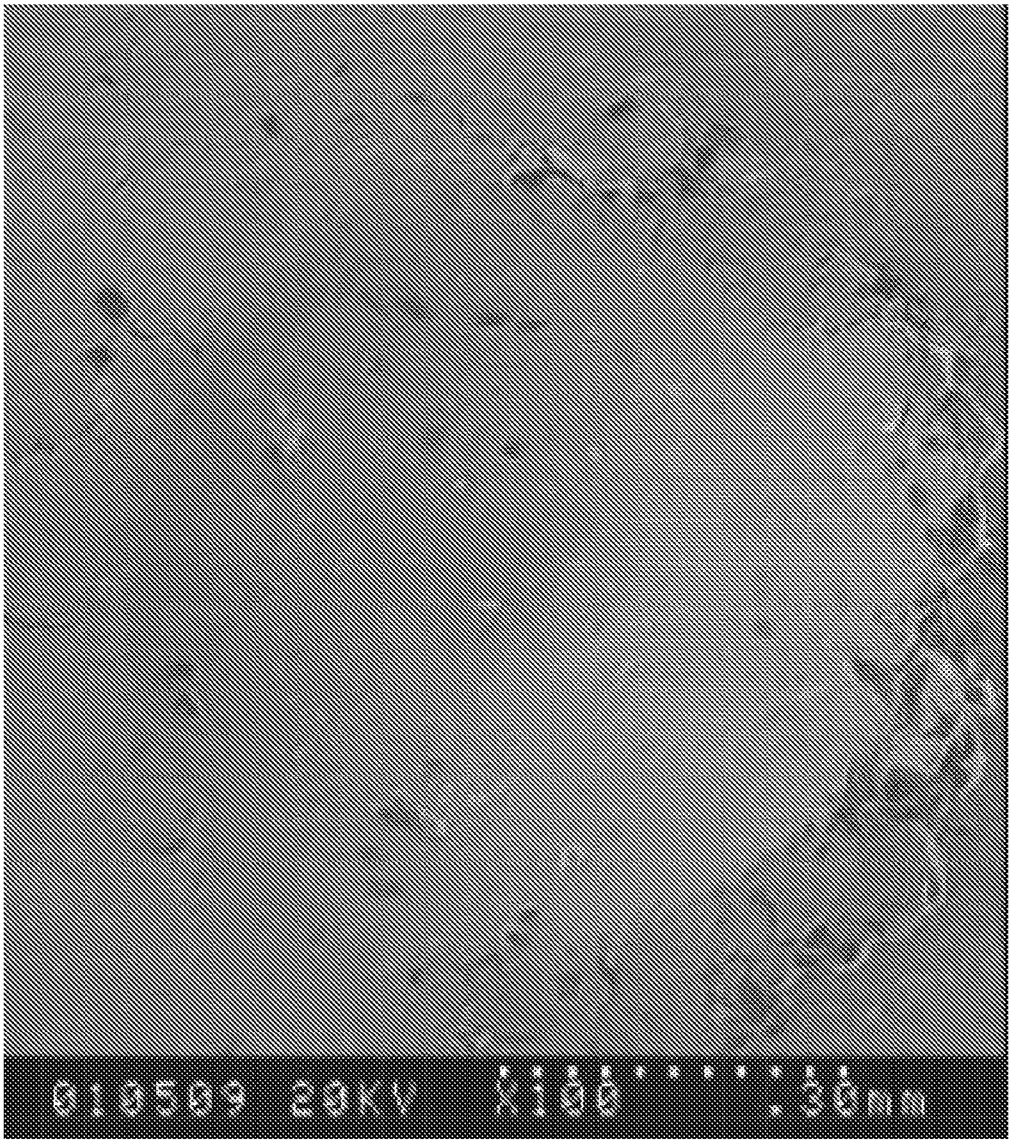

Two T-800 coating samples were prepared on a 416 stainless substrate, one according to the coating process of the invention, and the other by HVOF (high velocity oxyfuel) thermal spray coating. The two coatings were the same thickness and were indented under an equal force (hardness tester/50 kg). The HVOF thermal spray coating exhibited cracking at the indent (FIG. 9), whereas the coating applied according to the method of the invention (FIG. 10) did not, thus demonstrating a significant improvement in ductility.

When introducing elements of the present invention or the preferred embodiments thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above products and methods without departing from the scope of the invention, it is intended that all matter contained in the above description and shown in the accompanying drawings shall be interpreted as illustrative and not in a limiting sense.

What is claimed is:

1. A method of imparting high-temperature, degradation resistance to a metallic component comprising:

applying a metal slurry comprising solvent, binder, and metal particles of a Co-based alloy comprising between about 0.05 and about 0.5 wt % B, between about 5 and about 20 wt % Cr, between about 22 and 32 wt % Mo, between 1 and about 4 wt % Si, and balance Co to a surface of the metallic component, and wherein the metallic component has a body of a material selected from the group consisting of carbon steel, stainless steel, and alloy steel; and heating to remove the solvent and binder and to sinter the Co-based alloy to form a substantially continuous Co-based alloy coating on the surface of the metallic component, wherein the Co-based alloy coating has a microstructure characterized by a generally non-dendritic, irregularly spherical, nodular intermetallic phase.

2. The method of claim 1 wherein the Co-based alloy consists essentially of between about 0.05 and about 0.5 wt % B, between about 5 and about 20 wt % Cr, between about 22 and 32 wt % Mo, between 1 and about 4 wt % Si, and balance Co.

3. The method of claim 2 wherein the Co-based alloy coating has a thickness between about 100 and about 300 microns.

4. The method of claim 2 wherein said sintering is performed at a temperature in the range of 2200° F. to 2300° F.

5. The method of claim 1 wherein said sintering is performed at a temperature in the range of 2200° F. to 2300° F.

6. The method of claim 5 wherein the Co-based alloy coating has a thickness between about 100 and about 300 microns.

7. The method of claim 1 wherein the Co-based alloy coating has a thickness between about 100 and about 1000 microns.

8. The method of claim 1 wherein the Co-based alloy coating has a thickness between about 100 and about 300 microns.

9. The method of claim 1 wherein the Co-based alloy coating has a thickness between about 250 and about 300 microns.

10. The method of claim 1 wherein the Co-based alloy comprises about B-0.15%, Cr-8.5%, Mo-28%, Si-2.6%, and balance Co.

11. The method of claim 1 wherein the metal slurry consists essentially of the metal particles, the binder, and the solvent, and wherein the metal particles are an alloy consisting essentially of about B-0.15%, Cr-8.5%, Mo-28%, Si-2.6%, and balance Co.

12. The method of claim 1 wherein the Co-based alloy comprises about B-0.15%, Cr-14%, Mo-26%, Si-2.6%, and balance Co.

13. The method of claim 1 wherein the metal slurry consists essentially of the metal particles, the binder, and the solvent, and wherein the metal particles are an alloy consisting essentially of about B-0.15%, Cr-14%, Mo-26%, Si-2.6%, and balance Co.

14. The method of claim 1 wherein the Co-based alloy comprises about B-0.15%, Cr-17%, Mo-28%, Si-3.25%, and balance Co.

15. The method of claim 1 wherein the metal slurry consists essentially of the metal particles, the binder, and the solvent, and wherein the metal particles are an alloy consisting essentially of about B-0.15%, Cr-17%, Mo-28%, Si-3.25%, and balance Co.

16. The method of claim 1 wherein the intermetallic phase is Laves phase nodules comprising dispersed particles and interconnected particles, wherein interconnections between particles include a plurality of thin filamentous Laves phase interconnections between dispersed Laves phase particles.

17. A method of imparting high-temperature, degradation resistance to a metallic component comprising:

applying a metal slurry comprising solvent, binder, and metal particles of an alloy consisting essentially of between about 0.05 and about 0.5 wt % B, between about 5 and about 20 wt % Cr, between about 22 and 32 wt % Mo, between 1 and about 4 wt % Si, and balance Co to a surface of the metallic component, and wherein the metallic component has a body of a material selected from the group consisting of carbon steel, stainless steel, and alloy steel; and heating to remove the solvent and binder and to sinter the metal particles at a temperature in the range of 2200° F. to 2300° F. to form a substantially continuous Co-based alloy coating having a thickness between about 100 and about 1000 microns on the surface of the metallic component, wherein the Co-based alloy coating has a microstructure characterized by a generally non-dendritic, irregularly spherical, nodular intermetallic phase.

* * * * *